US012629839B2

(12) United States Patent
Cai et al.

(10) Patent No.: US 12,629,839 B2
(45) Date of Patent: May 19, 2026

(54) SYSTEM AND METHODS FOR ROBOTIC TELEOPERATION INTENTION ESTIMATION

(71) Applicant: Honda Motor Co., Ltd., Tokyo (JP)

(72) Inventors: Mingyu Cai, Tustin, CA (US); Karankumar Ashokbhai Patel, San Jose, CA (US); Soshi Iba, Mountain View, CA (US); Songpo Li, San Jose, CA (US)

(73) Assignee: Honda Motor Co., Ltd., Tokyo (JP)

( * ) Notice: Subject to any disclaimer, the term of this patent is extended or adjusted under 35 U.S.C. 154(b) by 79 days.

(21) Appl. No.: 18/825,339

(22) Filed: Sep. 5, 2024

(65) Prior Publication Data

US 2025/0083325 A1     Mar. 13, 2025

Related U.S. Application Data

(60) Provisional application No. 63/582,337, filed on Sep. 13, 2023.

(51) Int. Cl.
B25J 9/16          (2006.01)
G05B 13/02       (2006.01)

(52) U.S. Cl.
CPC .......... B25J 9/1689 (2013.01); G05B 13/027 (2013.01); *G05B 2219/40174* (2013.01)

(58) Field of Classification Search
CPC .......... B25J 9/161; B25J 9/163; B25J 9/1689; G05B 13/027
See application file for complete search history.

(56) References Cited

U.S. PATENT DOCUMENTS 11,351,671 B2 *   6/2022   Thackston ............. G05D 1/223
12,444,411 B1 *  10/2025   Derezhenets ....... G10L 15/1822
12,448,001 B2 *  10/2025   Bagnell ............. B60W 50/0097
(Continued)

OTHER PUBLICATIONS

Darvish, Kourosh, et al. "A hierarchaical architecture for human-robot cooperation processes." IEEE Transactions on Robotics 37.2 (2020): 567-586.

(Continued)

*Primary Examiner* — Wade Miles
*Assistant Examiner* — Zachary Joseph Wallace
(74) *Attorney, Agent, or Firm* — Rankin, Hill & Clark LLP

(57)          ABSTRACT
A system and method for robotic teleoperation enable a teleoperated robotic element to perform a sequence of actions based on intention estimation, eliminating the need for continuous human control. The system includes a robotic teleoperation input that receives motion inputs and gaze data from a human operator performing a robotic teleoperation task. A robotic teleoperation feature extractor analyzes and processes the motion inputs and the gaze data into sequential input data. A multi-window model assigns hierarchical prediction windows to the input data, generating windowed sequential data. A hierarchical neural network processes the windowed sequential data to determine low-level action intentions and high-level task intentions, and generates an intention estimation based on the low-level action intentions and the high-level task intentions. A hierarchical dependency model incorporates hierarchical dependent loss to refine the intention estimation.

20 Claims, 6 Drawing Sheets

(56) References Cited

U.S. PATENT DOCUMENTS

| | | | | |
|---|---|---|---|---|
| 12,499,879 | B1 * | 12/2025 | Soliman | G06F 40/295 |
| 2022/0314449 | A1 * | 10/2022 | Hosomi | B25J 9/1689 |
| 2023/0226698 | A1 * | 7/2023 | Chaki | B25J 13/006 |
| 2023/0234231 | A1 * | 7/2023 | Dong | G06F 3/013 |
| | | | | 700/248 |
| 2023/0286159 | A1 * | 9/2023 | Kondapally | B25J 13/02 |
| 2024/0051143 | A1 * | 2/2024 | Dong | B25J 13/02 |
| 2024/0149458 | A1 * | 5/2024 | Watabe | B25J 9/1689 |
| 2025/0001605 | A1 * | 1/2025 | Felip | B25J 9/1679 |
| 2025/0091214 | A1 * | 3/2025 | Kuang | B25J 9/163 |
| 2025/0108512 | A1 * | 4/2025 | Lima | G06F 3/011 |
| 2025/0205896 | A1 * | 6/2025 | Naramura | B25J 13/089 |
| 2025/0217114 | A1 * | 7/2025 | Roper, Jr. | G06N 3/02 |
| 2025/0375891 | A1 * | 12/2025 | Wen | B25J 9/1697 |

OTHER PUBLICATIONS

A. Graves and A. Graves, "Long short-term memory," Supervised sequence labelling with recurrent neural networks, pp. 37-45, 2012.

D. Aarno and D. Kragic, "Motion intention recognition in robot assisted applications," Robotics and Autonomous Systems, vol. 56, No. 8, pp. 692-705, 2008.

F. Abi-Farraj, T. Osa, N. P. J. Peters, G. Neumann, and P. R. Giordano, "A learning-based shared control architecture for interactive task execution," in 2017 IEEE international conference on robotics and automation (ICRA). IEEE, 2017, pp. 329-335.

K. I. Alevizos, C. P. Bechlioulis, and K. J. Kyriakopoulos, "Physical human-robot cooperation based on robust motion intention estimation," Robotica, vol. 38, No. 10, pp. 1842-1866, 2020.

A. Belardinelli, A. R. Kondapally, D. Ruiken, D. Tanneberg, and T. Watabe, "Intention estimation from gaze and motion features for human-robot shared-control object manipulation," in 2022 IEEE/RSJ International Conference on Intelligent Robots and Systems (IROS). IEEE, 2022, pp. 9806-9813.

E. De Momi, L. Kranendonk, M. Valenti, N. Enayati, and G. Ferrigno, "A neural network-based approach for trajectory planning in robot-human handover tasks," Frontiers in Robotics and AI, vol. 3, p. 34, 2016.

A. D. Dragan and S. S. Srinivasa, "A policy-blending formalism for shared control," The International Journal of Robotics Research, vol. 32, No. 7, pp. 790-805, 2013.

C. Fang, L. Peternel, A. Seth, M. Sartori, K. Mombaur, and E. Yoshida, "Human modeling in physical human-robot interaction: A brief survey," IEEE Robotics and Automation Letters, 2023.

J. T. Feddema and O. R. Mitchell, "Vision-guided servoing with feature-based trajectory generation (for robots)," IEEE Transactions on Robotics and Automation, vol. 5, No. 5, pp. 691-700, 1989.

C. Feichtenhofer, H. Fan, J. Malik, and K. He, "Slowfast networks for video recognition," in Proceedings of the IEEE/CVF international conference on computer vision, 2019, pp. 6202-6211.

D. Gao, W. Yang, H. Zhou, Y. Wei, Y. Hu, and H. Wang, "Deep hierarchical classification for category prediction in e-commerce system," arXiv preprint arXiv:2005.06692, 2020.

J.-H. Han, S.-H. Choi, and J.-H. Kim, "Interactive human intention reading by learning hierarchical behavior knowledge networks for human-robot interaction," ETRI Journal, vol. 38, No. 6, pp. 1229-1239, 2016.

K. Hauser, "Recognition, prediction, and planning for assisted teleoperation of freeform tasks," Autonomous Robots, vol. 35, pp. 241-254, 2013.

B. Hayes and B. Scassellati, "Autonomously constructing hierarchical task networks for planning and human-robot collaboration," in 2016 IEEE International Conference on Robotics and Automation (ICRA). IEEE, 2016, pp. 5469-5476.

S. Holtzen, Y. Zhao, T. Gao, J. B. Tenenbaum, and S.-C. Zhu, "Inferring human intent from video by sampling hierarchical plans," in 2016 IEEE/RSJ International Conference on Intelligent Robots and Systems (IROS). IEEE, 2016, pp. 1489-1496.

Z. Huang, Y.-J. Mun, X. Li, Y. Xie, N. Zhong, W. Liang, J. Geng, T. Chen, and K. Driggs-Campbell, "Hierarchical intention tracking for robust human-robot collaboration in industrial assembly tasks," in 2023 IEEE International Conference on Robotics and Automation (ICRA). IEEE, 2023, pp. 9821-9828.

G. Li, Z. Li, and Z. Kan, "Assimilation control of a robotic exoskeleton for physical human-robot interaction," IEEE Robotics and Automation Letters, vol. 7, No. 2, pp. 2977-2984, 2022.

Y. Li and S. S. Ge, "Human-robot collaboration based on motion intention estimation," IEEE/ASME Transactions on Mechatronics, vol. 19, No. 3, pp. 1007-1014, 2013.

W. Lu, Z. Hu, and J. Pan, "Human-robot collaboration using variable admittance control and human intention prediction," in 2020 IEEE 16th International Conference on Automation Science and Engineering (CASE). IEEE, 2020, pp. 1116-1121.

S. Manschitz and D. Ruiken, "Shared autonomy for intuitive teleoperation," ICRA Workshop: Shared Autonomy in Physical Human-Robot Interaction: Adaptability and Trust, May 2022.

T. Marcucci, M. Petersen, D. von Wrangel, and R. Tedrake, "Motion planning around obstacles with convex optimization," arXiv preprint arXiv:2205.04422, 2022.

L. R. Medsker and L. Jain, "Recurrent neural networks," Design and Applications, vol. 5, No. 64-67, p. 2, 2001.

D. Nicolis, A. M. Zanchettin, and P. Rocco, "Human intention estimation based on neural networks for enhanced collaboration with robots," in 2018 IEEE/RSJ International Conference on Intelligent Robots and Systems (IROS). IEEE, 2018, pp. 1326-1333.

L. R. Rabiner, "A tutorial on hidden markov models and selected applications in speech recognition," Proceedings of the IEEE, vol. 77, No. 2, pp. 257-286, 1989.

L. Rabiner and B. Juang, "An introduction to hidden markov models," ieee assp magazine, vol. 3, No. 1, pp. 4-16, 1986.

L. Rozo, S. Calinon, D. G. Caldwell, P. Jimenez, and C. Torras, "Learning physical collaborative robot behaviors from human demonstrations," IEEE Transactions on Robotics, vol. 32, No. 3, pp. 513-527, 2016.

P. Schydlo, M. Rakovic, L. Jamone, and J. Santos-Victor, "Anticipation in human-robot cooperation: A recurrent neural network approach for multiple action sequences prediction," in 2018 IEEE International Conference on Robotics and Automation (ICRA). IEEE, 2018, pp. 5909-5914.

T. B. Sheridan, "Teleoperation, telerobotics and telepresence: A progress report," Control Engineering Practice, vol. 3, No. 2, pp. 205-214, 1995.

L. X. Shi, A. Sharma, T. Z. Zhao, and C. Finn, "Waypointbased imitation learning for robotic manipulation," arXiv preprint arXiv:2307.14326, 2023.

Sohn, Sungryull, Junhyuk Oh, and Honglak Lee. "Hierarchical reinforcement learning for zero-shot generalization with subtask dependencies." Advances in neural information processing systems 31 (2018).

A. K. Tanwani and S. Calinon, "A generative model for intention recognition and manipulation assistance in teleoperation," in 2017 IEEE/RSJ International Conference on Intelligent Robots and Systems (IROS). IEEE, 2017, pp. 43-50.

A. K. Tanwani and S. Calinon, "Learning robot manipulation tasks with task-parameterized semitied hidden semi-markov model," IEEE Robotics and Automation Letters, vol. 1, No. 1, pp. 235-242, 2016.

A. Vaswani, N. Shazeer, N. Parmar, J. Uszkoreit, L. Jones, A. N. Gomez, Ł. Kaiser, and I. Polosukhin, "Attention is all you need," Advances in neural information processing systems, vol. 30, 2017.

R. Wilcox, S. Nikolaidis, and J. Shah, "Optimization of temporal dynamics for adaptive human-robot interaction in assembly manufacturing," Robotics, vol. 8, No. 441, pp. 10-15, 2013.

W. Yu, R. Alqasemi, R. Dubey, and N. Pernalete, "Telemanipulation assistance based on motion intention recognition," in Proceedings of the 2005 IEEE international conference on robotics and automation. IEEE, 2005, pp. 1121-1126.

C. Zhu, Q. Cheng, and W. Sheng, "Human intention recognition in smart assisted living systems using a hierarchical hidden markov

(56)          References Cited

OTHER PUBLICATIONS model," in 2008 IEEE International Conference on Automation Science and Engineering. IEEE, 2008, pp. 253-258.

* cited by examiner

SYSTEM AND METHODS FOR ROBOTIC TELEOPERATION INTENTION ESTIMATION

This application claims the benefit of U.S. provisional patent application Ser. No. 63/582,337, filed Sep. 13, 2023, which is incorporated by reference in its entirety herein.

BACKGROUND

Robotic teleoperation facilitates the performance of various tasks by robotic elements, bypassing the time, cost, and complexity associated with fully automated robotic operations. This approach advantageously combines the efficiency of robotic systems in executing repetitive, structured tasks with the flexibility of human control for real-time problem-solving under real-world constraints. Human-robotic interaction enables operators to perform tasks in environments where human presence could pose unnecessary risks. Furthermore, it allows operators to carry out tasks in remote locations without the need for physical presence or travel.

Human-robotic interaction is increasingly being adopted to assist in a wide range of tasks, including warehouse management, medical surgeries, underwater operations, nuclear waste removal, space missions, and other labor-intensive or potentially hazardous activities. The goal of human-robotic interaction is to reduce human workload while enhancing productivity and efficiency in these demanding tasks. However, deploying teleoperated robotics presents challenges such as communication delays, difficulties in accurate positioning due to noise and the inherent randomness of real-world conditions, and discrepancies between the human operator's site and the remote environments of the robotic elements.

BRIEF DESCRIPTION

According to one aspect, a system for robotic teleoperation includes a robotic teleoperation input, a robotic teleoperation feature extractor, a multi-window model, a hierarchical neural network, and a teleoperated robotic element. The robotic teleoperation input is configured to receive inputs of a human operator performing a robotic teleoperation task. The robotic teleoperation feature extractor is configured to analyze the inputs, extract features from the inputs, and process the extracted features into sequential input data. The multi-window model is configured to generate windowed sequential data based on the sequential input data. The hierarchical neural network is configured to determine intentions of the human operator based on the windowed sequential data, and generate an intention estimation based on the intentions. The teleoperated robotic element is configured to perform a sequence of actions associated with the intention estimation.

According to another aspect, a method for robotic teleoperation is provided. The method includes: receiving inputs of a human operator performing a robotic teleoperation task; analyzing the inputs; extracting features from the inputs; processing the extracted features into sequential input data; generating windowed sequential data based on the sequential input data; determining, with a hierarchical neural network, intentions of the human operator based on the windowed sequential data, and generating an intention estimation based on the intentions; and performing, with a teleoperated robotic element, a sequence of actions associated with the intention estimation.

According to yet another aspect, a non-transitory computer readable storage medium storing instructions that, when executed by a computer having a processor, cause the computer to perform a method for robotic teleoperation. The method includes: receiving inputs of a human operator performing a robotic teleoperation task; analyzing the inputs; extracting features from the inputs; processing the extracted features into sequential input data; generating windowed sequential data based on the sequential input data; determining, with a hierarchical neural network, intentions of the human operator based on the windowed sequential data, and generating an intention estimation based on the intentions; and performing, with a teleoperated robotic element, a sequence of actions associated with the intention estimation.

BRIEF DESCRIPTION OF THE DRAWINGS

FIG. 1 is an exemplary component diagram of a system for robotic teleoperation, according to one aspect.

DETAILED DESCRIPTION

Figure 2:
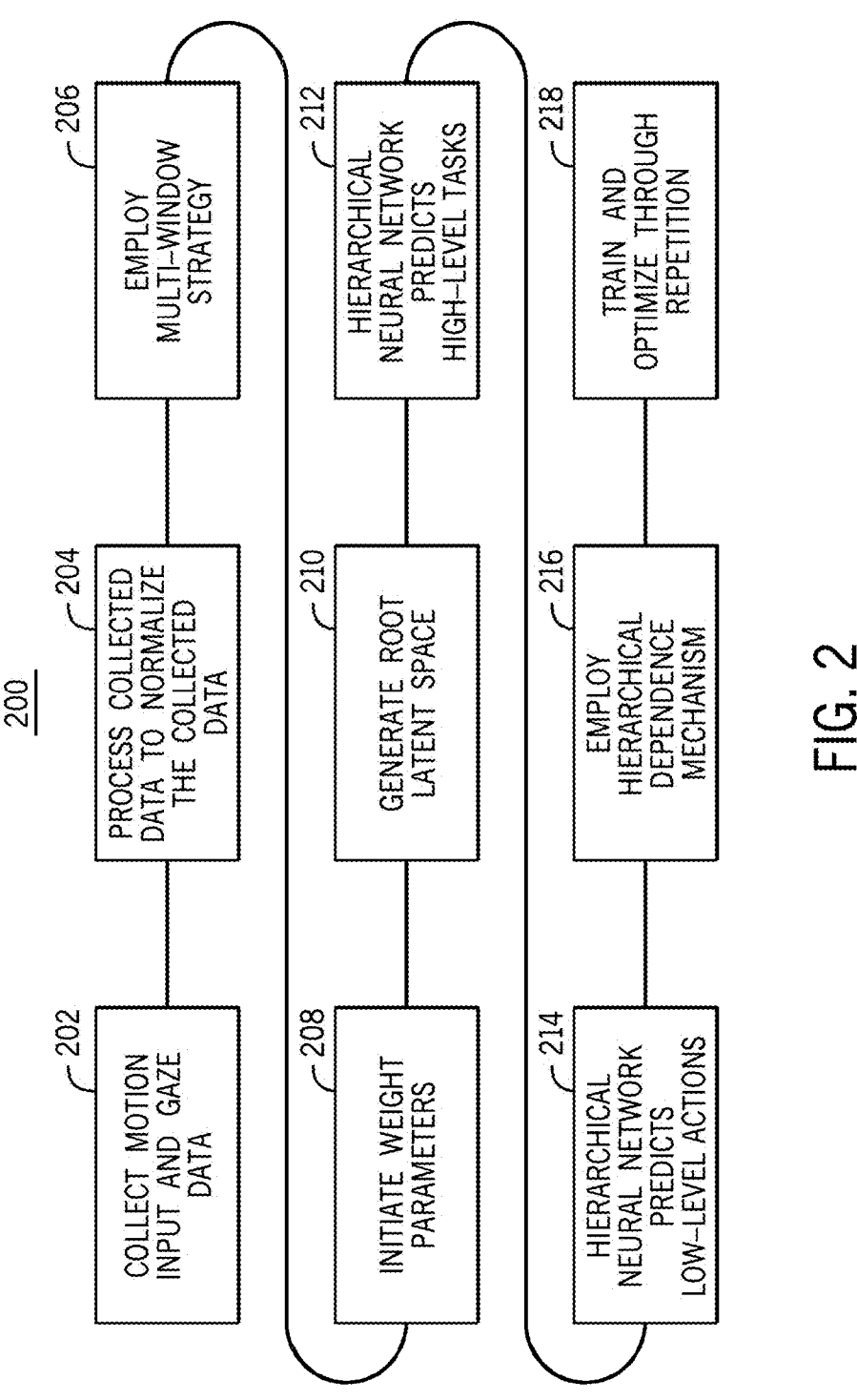
FIG. 2 is an exemplary training process flow for robotic teleoperation intention estimation, according to one aspect.

The system and methods described herein for robotic teleoperation can provide improvements in the operation and control of robotic systems by human operators. The methods augment the operation and control of downstream robotic systems, achieving a balance between full autonomy and pure teleoperation. Teleoperation intention estimation can enhance the accuracy of movement and positioning of robotic elements, ensuring that tasks are performed as intended even when communication delays temporarily interrupt operator control. This may prevent stalled or failed time-critical operations. Additionally, teleoperation intention estimation can mitigate mismatches between the operator's intentions and the actual movements of robotic elements due to environmental differences. This approach can allow human operators to focus on high-level decision-making while the robotic system handles the detailed kinematic aspects of low-level operations.

To address the challenges associated with teleoperation of robotic elements, the system and methods described herein perform teleoperation intention estimation to enhance the operation of robotic elements in the field. These methods involve a structured discovery of intention hierarchy based on a human operator's actions and visual gaze during the operation of robotic elements. Accurately understanding human intentions during task performance can ensure that a remote robot responds rapidly and makes reliable inferences about the operator's intended commands, even in the presence of communication delays, noise, and positioning errors.

The system and methods for teleoperation intention estimation include both low-level action intention estimation and high-level task intention estimation. Low-level intention estimation tracks fine actions for control assistance, while the high-level mechanism predicts the human operator's long-horizon coarse tasks. Instead of developing separate models for each level, which may lead to hierarchical inconsistency, the system employs a hierarchical classification strategy. This strategy utilizes a sequential neural network model that incorporates dependency information across hierarchical layers in a top-down manner, with the lower level outputs conditioned by the upper level.

To develop the system and methods described herein, the process may begin with training a hierarchical neural network for intention estimation in teleoperation tasks by collecting comprehensive data from human operators performing specific assembly tasks in a virtual environment. This data collection may include recording various features such as the orientation of objects, the movements of two-arm end-effectors, gaze geometries, and egocentric video frames using equipment like the HTC Vive Pro Eye headset, the Vive Lighthouse system, and other data collection devices. The collected dataset provides a robust foundation for training the hierarchical neural network, ensuring it has extensive and diverse information to learn from.

In preparing the hierarchical neural network for training, the collected data may undergo preprocessing to normalize features, ensuring that all inputs are treated equally by the neural networks. These networks may include Graph Convolutional Networks (GCN), Long Short-Term Memory (LSTM) networks, Recurrent Neural Networks (RNN), and a Slow-Fast model, either individually or in any reasonable combination. The dataset can be split into motion features and egocentric views, allowing the model to test its generalization capabilities with diverse inputs.

During training, the model's weights may be initialized, with some networks, such as the Slow-Fast model, using pre-trained weights from large-scale video classification datasets to enhance learning. This initialization can help the model leverage existing knowledge from similar tasks, accelerating the training process and improving the overall performance of the hierarchical structure.

The hierarchical classification within the model involves two primary layers: task prediction and action inference. These layers are structured in a tree format, with task prediction serving as the root layer and action inference as the leaf layer. The model may first process the sequential data to generate a root latent space representation, which is then used to predict tasks. The task prediction may subsequently condition the action inference, ensuring that the predictions at the action level are consistent with the identified tasks. This hierarchical approach leverages contextual relationships between tasks and actions, which can improve the accuracy of teleoperator intention estimation.

To maintain hierarchical consistency, the model may include a dependence mechanism that ensures the predicted actions are valid within the context of the predicted tasks. This mechanism can help avoid conflicts in the hierarchical structure, thereby enhancing the model's reliability and performance. Additionally, a multi-window strategy can address the issue of different input lengths required for task and action predictions. This strategy involves masking unnecessary parts of the input data, allowing the model to focus on relevant sequential information for each hierarchical level. By doing so, the model can effectively manage the varying lengths of data needed for accurate task and action predictions, thereby improving its overall performance.

For vision-based inputs, the model may utilize the Slow-Fast network to capture both temporal and spatial information. This network may include two pathways: a Slow Pathway for capturing spatial semantics and a Fast Pathway for capturing motion at fine temporal resolutions. Integrating this network with the hierarchical structure may allow the model to handle visual inputs effectively, demonstrating its versatility and robustness. By structuring the model hierarchically and employing strategies like multi-window input processing, the deep learning framework can achieve high prediction accuracy and early intention identification. This approach can enhance the effectiveness of robotic teleoperation in assembly tasks, providing reliable and accurate assistance to human operators performing robotic teleoperation tasks.

Definitions

The following includes definitions of selected terms employed herein. The definitions include various examples and/or forms of components that fall within the scope of a term and that may be used for implementation. The examples are not intended to be limiting. Furthermore, the components discussed herein, may be combined, omitted, or organized with other components or into different architectures.

"Agent" as used herein is a machine that moves in or manipulates an environment. Exemplary agents may include, but are not limited to, robots or other machines. The agent may be semi-autonomously or manually operated through remote teleoperation. "Agent system," as used herein may include, but is not limited to, any automatic or manual systems that may be used to enhance the agent, propel the agent, and/or provide for safe operation of the agent.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a bus that interconnects components inside an agent using protocols such as Media Oriented Systems Transport (MOST), Controller Area Network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more communicating devices (e.g., computer, personal digital assistant, cellular telephone, network device, vehicle, computing device, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface" as used herein may include input and/or output devices for receiving input and/or devices for outputting data. The input and/or output may be for controlling different agent features, which include various agent components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface which may be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. In one aspect, a database may be stored, for example, at a disk, data store, and/or a memory. A database may be stored locally or remotely and accessed via a network.

"Data store," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Display," as used herein may include, but is not limited to, LED display panels, LCD display panels, CRT display, touch screen displays, among others, that often display information. The display may receive input (e.g., touch input, keyboard input, input from various other input devices, etc.) from a user. The display may be accessible through various devices, for example, though a remote system. The display may also be physically located on a portable device, mobility device, or host.

"Hierarchical level," as used herein, may include, a specific layer or stage within a hierarchical neural network model that processes data at various levels of abstraction or granularity. In the context of robotic teleoperation, hierarchical levels may include low-level action intentions, which represent detailed, fine-grained actions, and high-level task intentions, which represent broader, more abstract goals or tasks. Each hierarchical level may involve multiple neural networks that process relevant sequential information to generate predictions.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Model," as used herein, refers to a mathematical or computational representation used to simulate, predict, or analyze the behavior of a system based on certain input data. In the context of robotic teleoperation, a model may include, but is not limited to, algorithms, neural networks, statistical methods, and machine learning techniques that process input data to generate predictions, classifications, or decisions.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, firmware interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, and embedded processors. In some aspects, a "portable device" could refer to a remote device that includes a processor for computing and/or a communication interface for receiving and transmitting data remotely.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

I. System Overview

Figure 1:
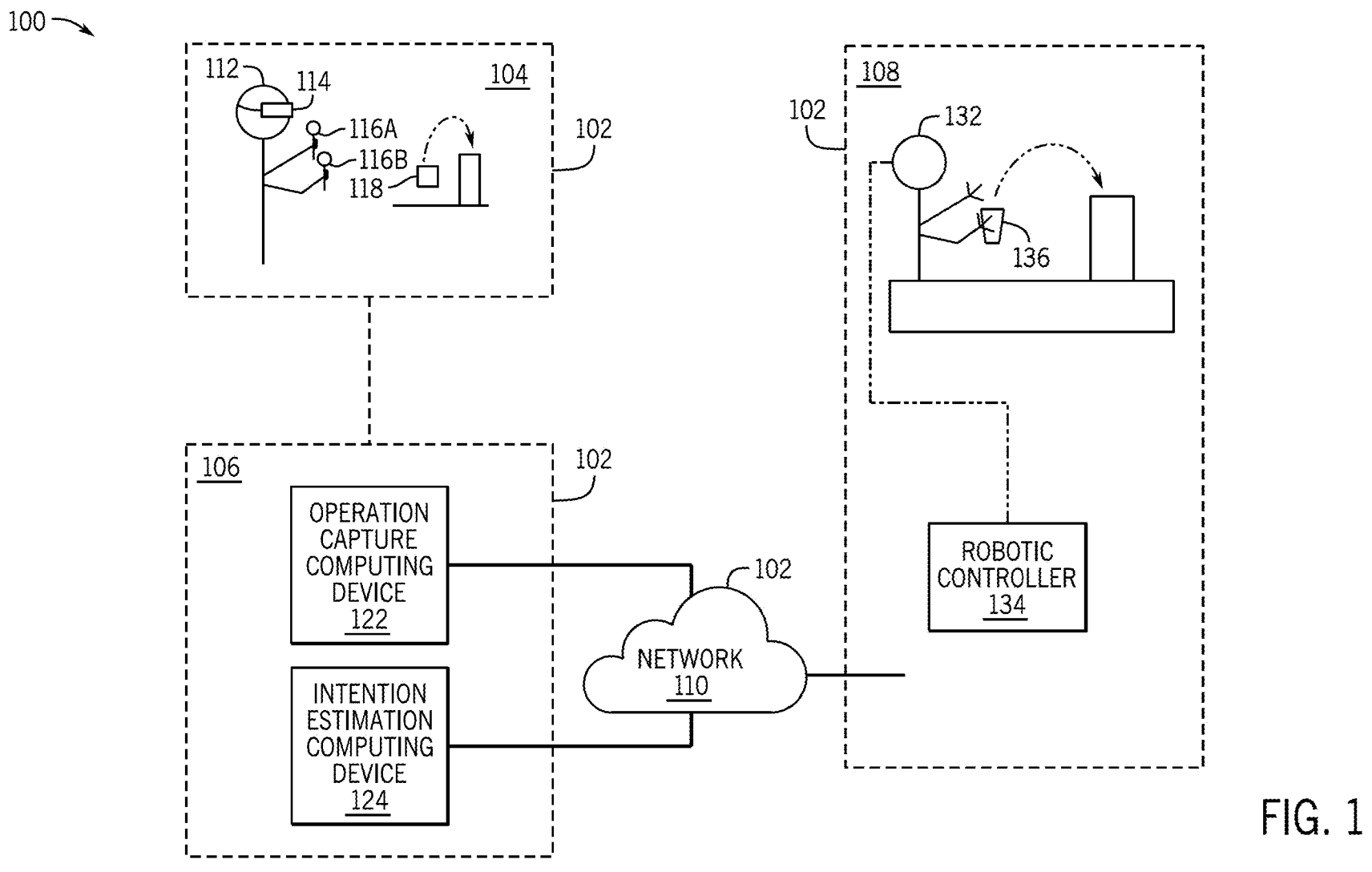

The drawings are for the purpose of illustrating one or more exemplary aspects and not for the purpose of limiting the same. FIG. 1 is an exemplary diagram of an operating environment 102 for robotic teleoperation intention estimation, according to one aspect. The operating environment 102 includes a local environment 104, one or more computing devices 106, and a remote robotic environment 108 that are communicatively interconnected by a network 110. The operating environment 102, having the local environment 104, one or more computing devices 106, the remote robotic environment 108, and the network 110, may define a system for robotic teleoperation 100.

The elements of the operating environment 102, as well as the components of the systems, hardware architectures, and software architectures discussed herein, may be combined, omitted, or organized into different architectures for various aspects. The computing devices 106 may be implemented with one or more physical computing devices or implemented using remote computing services and may include processors, central processing units, or the like.

The local environment 104 may include a human operator 112 equipped with an eye gaze capture device 114, one or more hand motion capture devices 116a, 116b (collectively hand motion capture devices 116), and a task platform 118. Together, the eye gaze capture device 114, the hand motion capture devices 116, and the task platform 118 may embody a robotic teleoperation input configured to receive motion inputs and gaze data of the human operator 112 while performing a robotic teleoperation task at the task platform 118.

An example eye gaze capture device 114 is a binocular Tobii eye tracker operating at 120 Hz. The human operator 112 may view the local environment 104 through a human operator interface such as an HTC Vive Pro Eye headset, which may be integrated with the eye gaze capture device 114 as a head mount display. Example hand motion capture devices 116 may include Oculus hand controllers. The elements of the local environment 104 are in communication with a computing device 106 such as operation capture computing device 122 which can be suitably configured for capturing and acquiring data associated with the capture devices 114, 116. The eye gaze capture device 114 may capture eye gaze data of the human operator 112 and transmit the eye gaze data in real-time to the operation capture computing device 122. The eye gaze capture device 114 may transmit the eye gaze data wireless as shown, or by a wired connection (not shown.) Similarly, the hand motion capture devices 116 may capture and transmit hand motion data wirelessly or by wired communications. In an aspect, the task platform 118 may provide data to the operation capture computing devices 122 about the movement of items associated with the task platform 118 and operations performed by the human operator 112.

The computing device 106 may include the operation capture computing device 122 that receives the eye gaze data and hand motion data, extracts features from the eye gaze data and the hand motion data, and processes the extracted features into sequential input data. Furthermore, the computing device 106 may include an intention estimation computing device 124 that assigns hierarchical prediction windows to the sequential data, generating windowed sequential data, and the intention estimation computing device 124 processes the windowed sequential data, with a hierarchical neural network to determine a plurality of low-level action intentions and a plurality of high-level task intentions based on the windowed sequential data. Furthermore, the intention estimation computing device 124 may be configured to generate an intention estimation based on the low-level action intentions and the high-level task intentions. In this way, the computing device 106 may be configured to function as a robotic teleoperation feature extractor, a multi-window model, and a hierarchical neural network configured to generate intention estimations. Furthermore, the intention estimation computing device 124 may be configured to incorporate hierarchical dependent loss to refine the intention estimations and, therefore, the intention estimation computing device 124 may also function as a hierarchical dependency model.

The computing device 106 may be connected locally or via the network 110, such as a LAN or WAN. In one aspect, the operation capture computing device 122 and the intention estimation computing device 124 may either reside on the same computing platform or device, or on separate platforms and devices, utilizing various communication and processing means.

The remote robotic environment 108 includes one or more robotic devices 132, a robotic controller 134, and a robotic task 136 that is to be operated or performed. The robotic device 132 may be operably controlled or directed by the robotic controller 134, which may be integrated into the robotic device 132. The robotic device 132 may be implemented as a part of an agent. The agent may be a robotic arm, a bipedal robot, a two-wheeled or four-wheeled robot, a vehicle, a self-propelled machine, or may be integrated with a special purpose machine for accomplishing a dedicated task, such as a medical device or industrial machinery. The agent may be configured as a humanoid robot. The humanoid robot may take the form of all or a portion of a robot. For example, the humanoid robot may take the form of an arm coupled to a hand with fingers.

In other aspects, the components and functions of the robotic device 132 may be implemented, for example, with other devices such as machines or devices associated with the robotic task 136 and connected via a network (e.g., the network 110). The robotic controller 134 may be a computing device 106 and may be capable of providing wired or wireless computer communications utilizing various protocols to send/receive electronic signals internally to/from components of the remote robotic environment 108. Additionally, the robotic controller 134 may be operably connected for internal computer communications via a bus (e.g., a Controller Area Network (CAN) or a Local Interconnect Network (LIN) protocol bus) to facilitate data input and output between the robotic controller 134 and other components of the operating environment 102.

A training process 200 for developing robotic teleoperation intention estimation is depicted in FIG. 2. The following description of the training process 200 in FIG. 2 can be adapted to different architectures for various aspects and is not intended to be limiting.

At block 202, comprehensive motion input and gaze data are collected from human operators performing specific teleoperation assembly tasks in an appropriate environment. This data may include features such as the orientation of objects, movements of two-arm end-effectors, gaze geometries, and egocentric video frames, recorded using equipment such as the HTC Vive Pro Eye headset and the Vive Lighthouse system or similar devices.

At block 204, the collected data may undergo preprocessing to normalize the features, ensuring all inputs are standardized and treated equally by the employed neural networks.

At block 206, to handle different input lengths required for task and action predictions, a multi-window strategy may be employed. This involves masking unnecessary parts of the input data, allowing for the appropriate consideration of relevant sequential information at each hierarchical level, thereby generating windowed sequential data. At block 208, weights (i.e., parameters within the model) can be initialized, which may include pre-trained weights from large-scale video classification datasets to leverage existing knowledge and enhance learning efficiency.

At block 210, the windowed sequential data can be used to generate a root latent space representation, which may be achieved through a root neural network, which may include various neural network architectures such as Long Short-Term Memory (LSTM) networks, Recurrent Neural Networks (RNNs), Transformers, Slow-Fast networks, or similar architectures. Using this root latent space representation, at block 212, a hierarchical neural network can predict high-level tasks, establishing the context for subsequent action inference. At block 214, the hierarchical neural network, which may use Convolutional Neural Networks (CNNs), Graph Convolutional Networks (GCNs), Slow-Fast networks, or similar architectures, may focus on predicting detailed, low-level actions. These action predictions may be conditioned on the outputs from the task prediction to ensure consistency and maintain hierarchical structure.

At block 216, a hierarchical dependence mechanism may be used to ensure consistency, making sure that predicted actions are valid within the context of predicted tasks, thereby enhancing reliability and performance in generating intention estimates. At block 218, the hierarchical neural network model, including task prediction, action inference, and hierarchical dependence mechanisms, can be trained and optimized using all relevant data collected and available through, for example, repetition. This comprehensive training process 200, which includes all preceding blocks, can ensure high prediction accuracy and early intention identification, thereby enhancing the effectiveness of robotic teleoperation in assembly tasks.

The system and devices described above may be operatively connected for computer communication via a network. The network can be a data network, the Internet, a wide area network (WAN), or a local area network (LAN). The network serves as a communication medium to various remote devices (e.g., databases, web servers, remote servers, application servers, intermediary servers, client machines, and other portable devices). Detailed aspects describing exemplary methods using the system and network configuration discussed above will now be discussed in detail.

II. Methods for Generating Intention Estimation

To set the foundation for a robotic teleoperation intention estimation method 400 and system 100 that accurately generates intention estimations of a human operator performing a teleoperation task, a set of m teleoperation tasks are denoted as T, each aiming to build desired target structures or complete particular target tasks. A human operator performs a set of n actions in total denoted as A, to actively complete the relevant task by executing action sequences unknown to the robot. The human intention at any given time-step t is defined as $H_t=(T_t,A_t)$, where $T_t \in T$ and $A_t \in A$ represent the task and action attempted to perform at time t. Online observation history $X_{1:t} \in R^{t \times F}$ is available to the system 100, which may include information on intention estimation (e.g., human-robot motion features, videos of surrounding cameras, egocentric views, gaze, etc., where F denotes the number of input features).

Different from conventional intention estimation systems and methods, the method 400 and the system 100 described herein can consider hierarchical intention relations. In application, each task $T_t$ does not include all action categories. For example, a structural building task does not involve actions related to screws. At every time-step t with the observation history, the objective is to accurately and efficiently predict a human operator's intention $H_t=(T_t,A_t)$ with hierarchical relations.

Figure 3:
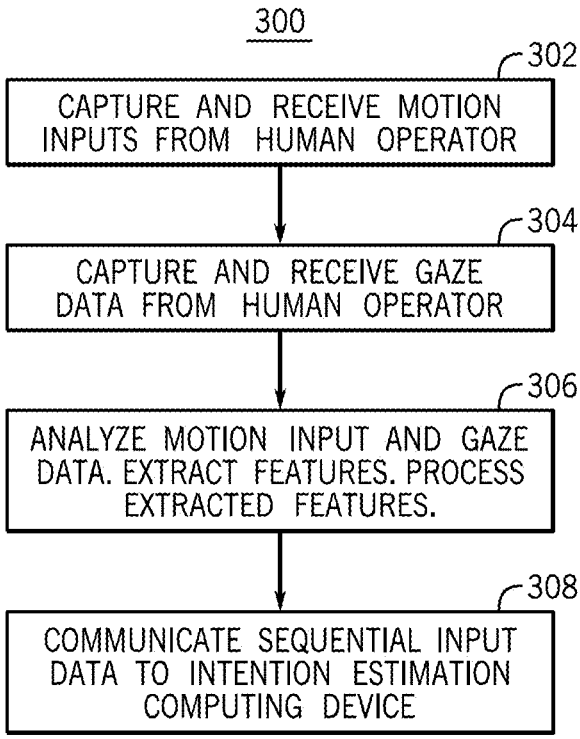
FIG. 3 is an exemplary process flow of a method for generating data for robotic teleoperation intention estimation, according to one aspect.

Referring now to FIG. 3, a method 300 for generating data for robotic teleoperation intention estimation will now be described according to an exemplary aspect. FIG. 3 will also be described with reference to FIGS. 1 and 2. For simplicity, the method 300 will be described as a sequence of elements, but it is understood that the elements of the method 300 may be organized into different architectures, blocks, stages, and/or processes, as described with respect to FIG. 1 and FIG. 2.

As shown in FIG. 3, at block 302, motion inputs are captured and received from the human operator 112 using the hand motion capture devices 116, while the human operator 112 performs the teleoperation task at the task platform 118. At block 304, gaze data is captured and received from the human operator 112 wearing the eye gaze capture device 114. At block 306, the operation capture computing device 122 analyzes the motion inputs and the gaze data associatively, extracts features from the motion inputs and the gaze data, and processes the extracted features into sequential input data. At block 308, the sequential input data is communicated to the intention estimation computing device 124 for hierarchical prediction window assignment.

Figure 4:
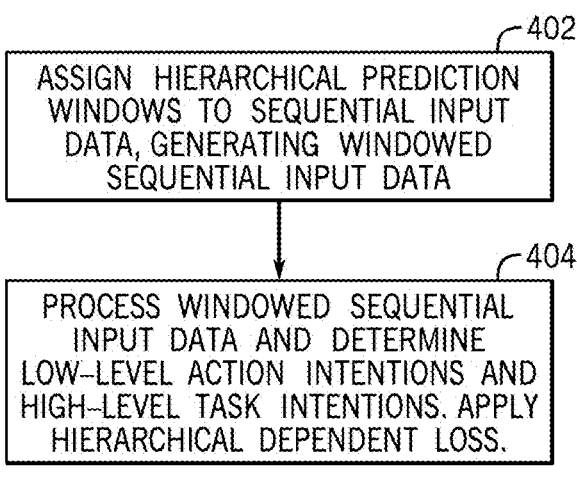
FIG. 4 is an exemplary process flow of a method for robotic teleoperation, according to one aspect.

Referring now to FIG. 4, the method 400 for robotic teleoperation intention estimation will be described further according to an exemplary aspect. FIG. 4 will also be described with reference to FIGS. 1 and 2. For simplicity, the method 400 will be described as a sequence of elements, but it is understood that the elements of the method 400 may be organized into different architectures, blocks, stages, and/or processes.

At block 402 of the method 400, the intention estimation computing device 124 is configured to assign hierarchical prediction windows to the sequential input data, thereby generating windowed sequential data. In order to handle the dynamic input and varying lengths of the sequential input data, a multi-window strategy may be used. This strategy involves selecting an appropriate window size, denoted as L, which represents the number of most recent time steps to be considered. The intention estimation computing device 124 then processes the sequential input data within this window size, generating a windowed input matrix $X \in \mathbb{R}^{L \times F} = X_{t-L:t}$ as windowed sequential data.

It is noted that during the training process 200 of the system 100, the ground truth intention $H_t = (T_t, A_t)$ of the human operator 112, representing the correct task and action attempted at the current time step t, may be used to compare against the predicted intention to guide the learning process through standard annotation processes. Alternatively, the system 100 may be configured to receive ground truth information for further training or fine-tuning during operation to continuously improve the accuracy of intention estimation.

At block 404, the intention estimation computing device 124 may process the windowed sequential data and determine a plurality of low-level action intentions and a plurality of high-level task intentions based on the windowed sequential data. The intention estimation computing device 124 may organize and categorize the intention predictions using a hierarchical tree structure with two layers. The first layer may involve task predictions $Y_T$, which represent high-level goals, and the second layer may involve action inferences $Y_A$, which represent specific low-level actions needed to achieve these tasks. Let $\tilde{T}$ and $\tilde{A}$ denote the outputs of layers $Y_T$ and $Y_A$ at time-step t. Since the predictions rely on contextual relations of observation history, this framework applies sequential neural network models as the backbone, e.g., RNN, LSTM, Transformer, Slow-Fast, Convolutional Neural Networks (CNNs), Gated Recurrent Units (GRUs), Bidirectional LSTM, and other similar architectures. The applied backbone (root) neural network is defined as $N_r(X, \theta_r)$, where $\theta_r$ are the parameters to be trained. Its output can be regarded as the root latent space: $X_r = N_r(X, \theta_r)$.

Given the root representation, the objective of the intention estimation computing device 124 is to generate hierarchical representations for task and action layers. Since the action layer is the leaf node of the task layer, the neural network hierarchical structure may be designed such that the action prediction is conditioned on the task inference, i.e., $P(\tilde{A}_t/\tilde{T}_t)$, where $P(\bullet/\bullet)$ represents the conditioned probability. To do so, task and action encoders may be constructed to generate task-level representations and action-level representations, respectively, i.e., $X_T = N_T(X_r, \theta_T)$ and $X_A = N_A(X_r, \theta_A)$.

Then, the task classification layer may be designed using a Softmax regression as:

$$\widetilde{y_{Ti}} = \frac{\exp(W_{Ti} \cdot X_T)}{\sum_{k=1}^{m} \exp(W_{Tk} \cdot X_T)} \tag{1}$$

Where $W_{Ti}$ are the parameters (weights) of ith task category. To condition the prediction of action, the action and task embeddings are concatenated i.e., $X_{A|T} = X_A \oplus X_T$. Similarly, the action classification layer may be constructed as:

$$\widetilde{y_{Ai}} = \frac{\exp(W_{Ai} X_{A|T})}{\sum_{k=1}^{n} \exp(W_{Ak} X_{A|T})} \tag{2}$$

Where $W_{Ai}$ are the parameters (weights) of ith action category. Finally, the inference results $\tilde{T}$ and $\tilde{A}$ may be obtained by taking the argument of the maximum of $\tilde{y}T$ and $\tilde{y}A$. The classification loss function of action and task may be designed through standard classification entropy loss as:

$$E_{Loss} = T_t \cdot \log(\tilde{T}_t) + A_t \cdot \log(\widetilde{A_t}) \tag{3}$$

To enhance the hierarchy relations, $\mathbb{D}$, $\mathbb{I}$, and $\mathbb{I}_H$ are introduced to indicate whether the intention predictions of the neural network model have conflicting hierarchical category structure, i.e., $$A_t \notin A_t^T$$

especially:

$$\mathbb{D} = \begin{cases} 1 & \text{if } A_t \in A_i^T \\ 0 & \text{otherwise} \end{cases} \quad \mathbb{I}_A = \begin{cases} 1 & \text{if } \tilde{A}_t = A_t \\ 0 & \text{otherwise} \end{cases} \quad \mathbb{I}_T = \begin{cases} 1 & \text{if } \tilde{T}_t = T_t \\ 0 & \text{otherwise} \end{cases} \tag{4}$$

Based on that, hierarchical dependence loss may be formulated as:

$$DLoss = -(ploss)^{\mathbb{D} \cdot \mathbb{I}_A} * (ploss)^{\mathbb{I}_A \cdot \mathbb{I}_T}. \tag{5}$$

The total loss of the intention estimation model may be defined as the weighted summation of the classification entropy loss Eloss and hierarchical dependence loss Dloss i.e., as follows:

$$Loss(\theta) = \alpha \cdot ELoss + \beta \cdot DLoss, \tag{6}$$

Where $\alpha \in (0, 1)$, $\beta \in (0, 1)$ are tuning parameters to bias the weights of different loss functions.

With this structure, the intention estimation computing device 124 may be configured to function as a hierarchical neural network and a hierarchical dependency model, wherein the hierarchical neural network is configured to process the windowed sequential data, determine a plurality of low-level action intentions and a plurality of high-level task intentions based on the windowed sequential data, and generate an intention estimation based on the low-level action intentions and the high-level task intentions, and the hierarchical dependency model is configured to incorporate hierarchical dependent loss to refine the intention estimation.

With regard to the hierarchical dependency model, the intention estimation computing device 124 may be configured to calculate the hierarchical dependent loss based on a consistency between the low-level action intentions and the high-level task intentions, wherein the hierarchical dependent loss may penalize inconsistencies to refine the intention estimation. Additionally, the hierarchical dependent loss may be combined with a classification entropy loss to form a total loss function for training the hierarchical neural network, in which the total loss function is a weighted sum of the classification entropy loss and the hierarchical dependent loss, with the weights being tuning parameters to balance the hierarchical dependent loss and the classification entropy loss.

Returning to the implementation of the multi-window model strategy at block 402, in the practice of sequential models, the length of input data may affect classification accuracies. In this case, the action inference may need a shorter length of input sequential data compared with task prediction, whereas many deep learning models require a fixed length of input sequential data. Directly sharing the same input with the longest length of data for both task and action recognition is not ideal, since additional unnecessary information may confuse the action inference model and degrade its performance.

To address the issue and achieve more informative inputs, the multi-window strategy described herein may use a mask technique. In particular, a latent embedding space for task and action is created, respectively. Each window takes different inputs such that unnecessary horizons of input data are masked for action embeddings. This allows the model to discard masked information and operate only on useful data horizons at hierarchical levels. In particular, $M \in \{0, 1\}^{(L0+L1)}$ is denoted as a sequential mask vector, where $L_0 + L_1 = L$ and 0 indicates a time-step (index) that is invisible for the model, and vice versa. Here $L_0$ represents prefix data that should be masked, and $L_1$ represents suffix data that should be kept the same. Let $M[i]$ denote the ith element of the mask vector. Thus, $M[i]=0$, $\forall L_0 \geq i > 0$, and $M[j]=1$, $\forall L_1 \geq j > L_0$ is had. Given the current input $X \in \mathbb{R}^{L \times F}$, the mask process generates the representation of valid inputs $\hat{X} \in \mathbb{R}^{L \times F}$ as:

$$\text{Mask}(X, M) = \left\{ X[i]: \left\{ \begin{array}{cc} X[i] & \text{if } M[i]=1 \\ 0 & \text{otherwise} \end{array} \right\} \right\} \quad (7)$$

The hierarchical prediction windows may be dynamically configured based on a calculated complexity and duration of the robotic teleoperation task being performed. Furthermore, the assigned hierarchical prediction windows have varying lengths, such that shorter windows are used for the low-level action intentions and longer windows are used for the high-level task intentions. In this framework, the L of input data X is chosen as the sequential length for parent (task) layer prediction, since the one task has longer horizons including a sequence of actions. Then, $L_1$ is selected according to the longest duration of all actions. Finally, X and X=Mask (X, M) is forwarded as the input of take and action embedding models, respectively. As a result, the task and action embeddings can be produced in a heterogeneous way i.e., $$\left\{ \begin{array}{l} X_T = \mathcal{N}_T(\mathcal{N}_r(X, \theta_r), \theta_T) \\ X_A = \mathcal{N}_A(\mathcal{N}_r(\text{Mask}(X, M), \theta_r), \theta_A). \end{array} \right. \quad (8)$$

The Slow-Fast model, which can learn useful temporal information for video recognition from visual input, may be used to further evaluate the performance of the deep hierarchical model discussed herein. This model includes two pathways: a Slow Pathway, operating at a predetermined low frame rate to capture spatial semantics, and a Fast Pathway, operating at a predetermined high frame rate to capture motion at a fine temporal resolution. The motivation for applying such neural network models is that motion feature data may not always be available. In practice, it is also beneficial to predict intentions using only perceptual information.

Herein, the standard Slow-Fast model can be extended by integrating the developed hierarchical structure, where the primary model extracts temporal and spatial information as the inputs of task and action embeddings. The mask mechanism is modified in a way that $X[i] \in \mathbb{R}^{H \times W \times C}$ of egocentric history $X \in \mathbb{R}^{L \times H \times W \times C}$ is the frame images, where H, W, C represent width, height, and a number of channels. The mask process is still the same as described above by setting the elements of the 3D matrix X[i] as zero. Finally, a multi-perception layer can be added at the end to produce task and action embeddings.

Once the aforementioned implementations are performed in any reasonable order, combination, or structural architecture resulting in an intention estimation, at block 404, the intention estimation computing device 124 may output the intention estimation via the network 110. This allows the intention estimation results attained by the computing device 106 to be passed to the robotic controller 134, providing autonomous AI support by the robotic controller 134 and the robotic device 132. This process helps mitigate the operational workload associated with the robotic task 136 that is to be operated or performed.

Figure 5:
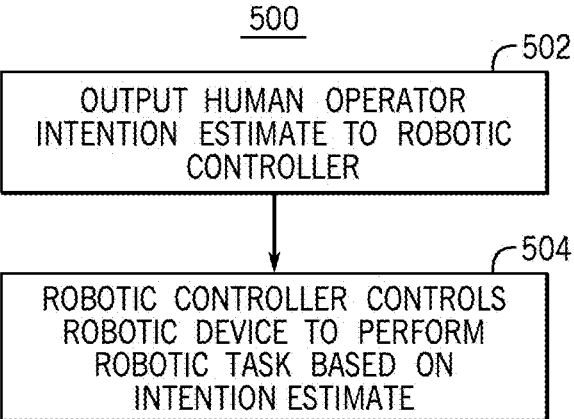
FIG. 5 is an exemplary process flow of a method of performing robotic teleoperation using intention estimation, according to one aspect.

In this regard, referring now to FIG. 5, a method 500 for performing robotic teleoperation using intention estimation will now be described according to an exemplary aspect. FIG. 5 will also be described with reference to FIGS. 1-4. For simplicity, method 500 will be described as a sequence of elements, but it is understood that the elements of the method 500 may be organized into different architectures, blocks, stages, and/or processes.

At block 502, based on the intention estimation results obtained by the intention estimation computing device 124 through the processes described in relation to FIGS. 3 and 4, the computing device 106 may conditionally output the intention estimate to the robotic controller 134 to operate the robotic device 132. At block 504, the robotic controller 134 controls the robotic device 132 to perform the robotic task 136 based on the intention estimate. In an aspect, the human intention output obtained by the intention estimation computing device 124 may be sent as a control signal to the robotic controller 134 in the absence of direct control signals from the human operator. For example, a control signal corresponding to the determined human intention may be output if communications are determined to be temporarily interrupted or delayed due to network issues. This may be further conditioned based on a variety of available information, such as how time critical the particular robotic operation is, an estimation of any risk in performing the particular robotic operation without direct human control, a threshold value of maximum likelihood estimation being met or exceeded (for example a 95% confidence level), prior authorization granted by the human operator, or any other suitable criteria or combinations of criteria.

There are two common existing formulations to assist the human operator 112. First, shared control to correct the movement of the robot arm according to intention predictions. Alternatively, continuously operating the remote arm for routine tasks can be cumbersome for the human operator 112, especially in the presence of communication latency. In such a scenario, the human operator 112 may relax, and the system 100 will automatically switch to autonomous control mode, with the robotic controller 134 implementing the intention estimation as inputs to the robotic device 132.

Furthermore, a combination of shared and fully autonomous control by the system 100 can be achieved in a switching manner. The system 100 can be configured to recursively re-plan through trajectory generation or imitation learning policies to execute the task and corresponding action sequence for the next steps. The operator can take over control at any time and customize their desired behaviors. In this way, the system 100 can be configured to include and may function as an assistive control module.

When conducting remote teleoperations, the human operator 112 may only receive perception information from the virtual fixtures of the robots, resulting in a reality gap between the operator's simulated scenarios and the robots' actual workspace. It is particularly challenging for humans to achieve real contacts remotely. Therefore, this framework may include an AI support module that leverages the manifold information of objects to align the robot's motion with the desired contact path.

In an aspect, the human intention output may be used to refine the operation of the robotic elements in combination with one or more control signals received from the human operator 112 that is teleoperating the robotic elements. For example, if due to positioning error or time delays the intended operation of the human operator 112 would not be successful, or if the intended operation could be performed with a threshold measure of improvement or likelihood of success, control of the robotic elements may be augmented using the human intention output to prevent operator failure or improve the intended operation by the human operator 112 teleoperating the robotic elements.

In an aspect, the robotic controller can be integrated with the robotic elements. In an aspect, the human intention output can include indicia corresponding to the human intention output or any other related data.

Figure 6:
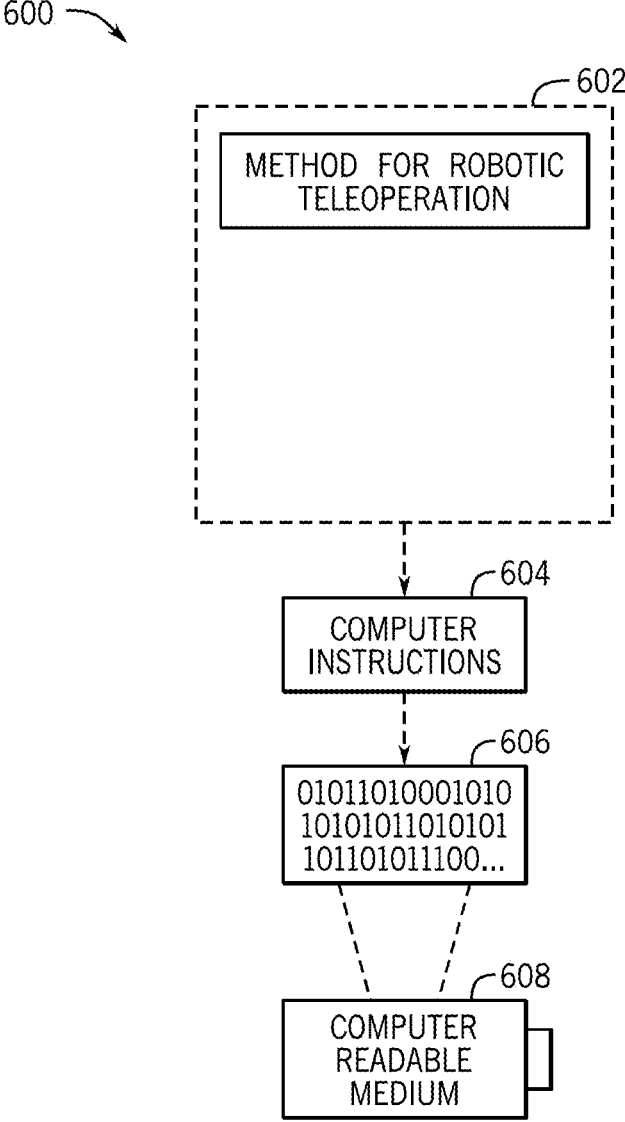
FIG. 6 is an illustration of an example computer-readable medium or computer-readable device including processor-executable instructions configured to embody one or more of the provisions set forth herein, according to one aspect.

Referring now also to FIG. 6, in another aspect a computer-readable medium including processor-executable instructions configured to implement one aspect of the techniques presented herein. An aspect of a computer-readable medium or a computer-readable device devised in these ways is illustrated wherein an implementation 600 includes a computer-readable medium 608, such as a CD-R, DVD-R, flash drive, a platter of a hard disk drive, etc., on which is encoded computer-readable data 606. This encoded computer-readable data 606, such as binary data including a plurality of zero's and one's as shown in 606, in turn includes a set of processor-executable computer instructions configured to operate according to one or more of the principles set forth herein. In this implementation 600, processor-executable computer instructions 604 may be configured to perform a method 602, such as the method 300 of FIG. 3 and/or the method 400 of FIG. 4, and/or the method 500 of FIG. 5. In another aspect, the processor-executable computer instructions may be configured to implement a system, as shown in the operating environment 102 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 7:
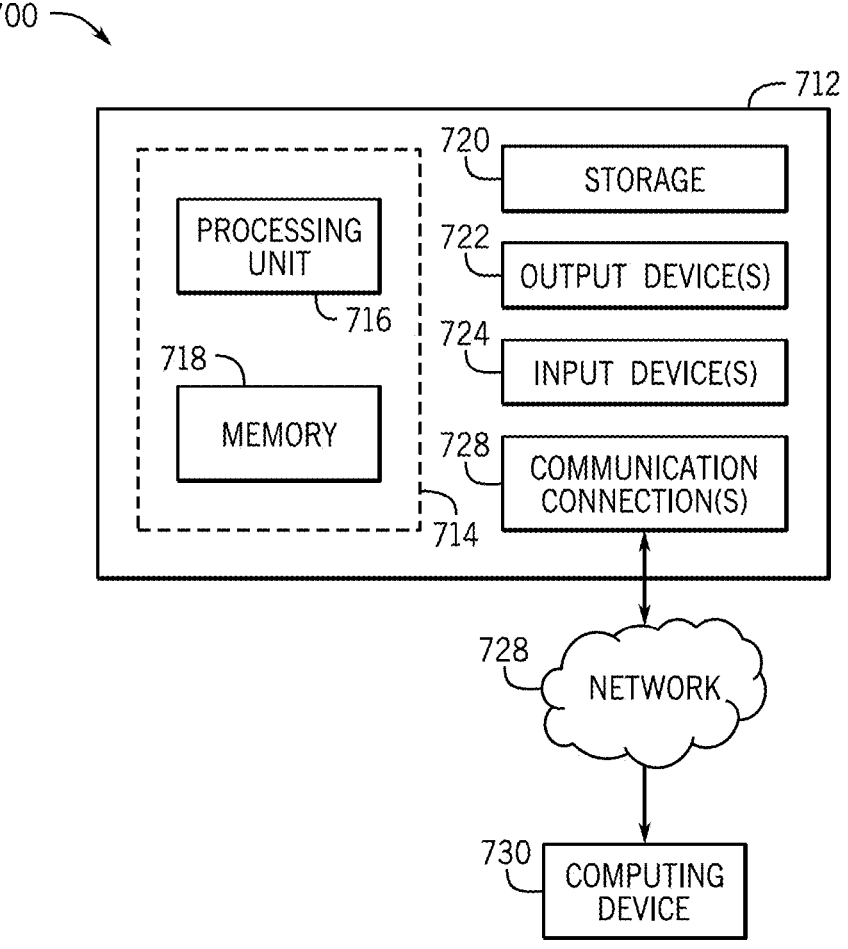
FIG. 7 is an illustration of an example computing environment where one or more of the provisions set forth herein are implemented, according to one aspect.

FIG. 7 and the following discussion provide a description of a suitable computing environment to implement aspects of one or more of the provisions set forth herein. The operating environment of FIG. 7 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, embedded processors or controllers, minicomputers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 7 illustrates a system 700 including an apparatus 712 configured to implement one aspect provided herein. In one configuration, the apparatus 712 includes at least one processing unit 716 and memory 718. Depending on the exact configuration and type of computing device, memory 718 may be volatile, such as RAM, non-volatile, such as ROM, flash memory, etc., or a combination of the two. This configuration is illustrated in FIG. 7 by dashed line 714.

In other aspects, the apparatus 712 includes additional features or functionality. For example, the apparatus 712 may include additional storage such as removable storage or non-removable storage, including, but not limited to, magnetic storage, optical storage, etc. Such additional storage is illustrated in FIG. 7 by storage 720. In one aspect, computer readable instructions to implement one aspect provided herein are in storage 720. Storage 720 may store other computer readable instructions to implement an operating system, an application program, etc. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the apparatus 712. Any such computer storage media is part of the apparatus 712.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The apparatus 712 includes input device(s) 724 such as keyboard, mouse, pen, voice input device, touch input device, infrared cameras, video input devices, or any other input device. Output device(s) 722 such as one or more displays, speakers, printers, or any other output device may be included with the apparatus 712. Input device(s) 724 and output device(s) 722 may be connected to the apparatus 712 via a wired connection, wireless connection, or any combination thereof. In one aspect, an input device or an output device from another computing device may be used as input device(s) 724 or output device(s) 722 for the apparatus 712. The apparatus 712 may include communication connection(s) 726 to facilitate communications with one or more other devices 730, such as through network 728, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for robotic teleoperation, comprising:
a robotic teleoperation input configured to receive inputs of a human operator performing a robotic teleoperation task;
a robotic teleoperation feature extractor configured to:
analyze the inputs,
extract features from the inputs, and
process the extracted features into sequential input data;
a multi-window model configured to generate windowed sequential data based on the sequential input data;
a hierarchical neural network configured to determine intentions of the human operator based on the windowed sequential data, and generate an intention estimation based on the intentions; and
a teleoperated robotic element configured to perform a sequence of actions associated with the intention estimation.

2. The system of claim 1, wherein the hierarchical neural network is further configured to train a recurrent neural network based on the intention estimation.

3. The system of claim 1, wherein the hierarchical neural network includes:
a root neural network that processes the windowed sequential data to generate a root latent space representation;
a task encoder that generates task-level representations from the root latent space representation; and
an action encoder that generates action-level representations from the root latent space representation, conditioned on the task-level representations.

4. The system of claim 1, wherein the multi-window model implements a sequential mask vector to discard unnecessary horizons of the sequential input data.

5. The system of claim 1, further including an assistive control module configured to automatically switch to an autonomous control mode in a presence of communication latency to execute the sequence of actions associated with the intention estimation based on a confidence calculation associated with the intention estimation.

6. The system of claim 1, wherein the hierarchical neural network is trained by a dataset including labeled teleoperation sequences, including various assembly tasks and corresponding action sequences.

7. The system of claim 1, further including a hierarchical dependency model configured to incorporate hierarchical dependent loss to refine the intention estimation.

8. The system of claim 1, wherein the multi-window model is configured to assign hierarchical prediction windows having varying lengths to the sequential input data in generating the windowed sequential data.

9. The system of claim 1, wherein the hierarchical neural network includes a Slow-Fast model for processing the inputs, which includes:
a Slow Pathway operating at a predetermined low frame rate to capture spatial semantics as spatial information;
a Fast Pathway operating at a predetermined high frame rate to capture motion as temporal information; and a multi-perception layer configured to integrate the spatial information and the temporal information to generate task and action embeddings.

10. A method for robotic teleoperation, comprising:

receiving inputs of a human operator performing a robotic teleoperation task;

analyzing the inputs;

extracting features from the inputs;

processing the extracted features into sequential input data;

generating windowed sequential data based on the sequential input data;

determining, with a hierarchical neural network, intentions of the human operator based on the windowed sequential data, and generating an intention estimation based on the intentions; and performing, with a teleoperated robotic element, a sequence of actions associated with the intention estimation.

11. The method of claim 10, further including training a recurrent neural network based on the intention estimation.

12. The method of claim 10, wherein the hierarchical neural network includes:

a root neural network that processes the windowed sequential data to generate a root latent space representation;

a task encoder that generates task-level representations from the root latent space representation; and an action encoder that generates action-level representations from the root latent space representation, conditioned on the task-level representations.

13. The method of claim 10, further including implementing a sequential mask vector to discard unnecessary horizons of the sequential input data.

14. The method of claim 10, further including automatically switching to an autonomous control mode of the teleoperated robotic element in a presence of communication latency to execute the sequence of actions associated with the intention estimation based on a confidence calculation associated with the intention estimation.

15. The method of claim 10, wherein the hierarchical neural network is trained by a dataset including labeled teleoperation sequences, including various assembly tasks and corresponding action sequences.

16. The method of claim 10, further including incorporating hierarchical dependent loss to refine the intention estimation.

17. The method of claim 16, wherein the hierarchical dependent loss is combined with a classification entropy loss to form a total loss function for training the hierarchical neural network, and the total loss function includes a weighted sum of weights of the classification entropy loss and the hierarchical dependent loss.

18. The method of claim 10, further including assigning hierarchical prediction windows having varying lengths to the sequential input data in generating the windowed sequential data.

19. The method of claim 10, wherein the hierarchical neural network includes a Slow-Fast model for processing the inputs, which includes:

a Slow Pathway operating at a predetermined low frame rate to capture spatial semantics as semantic information;

a Fast Pathway operating at a predetermined high frame rate to capture motion as temporal information; and a multi-perception layer configured to integrate the spatial information and the temporal information to generate task and action embeddings.

20. A non-transitory computer readable storage medium storing instructions that when executed by a computer having a processor to perform a method for robotic teleoperation, the method comprising:

receiving inputs of a human operator performing a robotic teleoperation task;

analyzing the inputs;

extracting features from the inputs;

processing the extracted features into sequential input data;

generating windowed sequential data based on the sequential input data;

determining, with a hierarchical neural network, intentions of the human operator based on the windowed sequential data, and generating an intention estimation based on the intentions; and performing, with a teleoperated robotic element, a sequence of actions associated with the intention estimation.

\*   \*   \*   \*   \*